United States Patent
Glauning

(10) Patent No.: US 10,439,190 B2
(45) Date of Patent: Oct. 8, 2019

(54) HANDHELD POWER TOOL BATTERY PACK

(71) Applicant: Robert Bosch GmbH, Stuttgart (DE)

(72) Inventor: Rainer Glauning, Leinfelden-Echterdingen (DE)

(73) Assignee: Robert Bosch Gmbh, Stuttgart (DE)

( * ) Notice: Subject to any disclaimer, the term of this patent is extended or adjusted under 35 U.S.C. 154(b) by 0 days.

(21) Appl. No.: 14/308,157

(22) Filed: Jun. 18, 2014

(65) Prior Publication Data

US 2014/0377622 A1     Dec. 25, 2014

(30) Foreign Application Priority Data

Jun. 19, 2013 (DE) .................. 10 2013 211 459
May 19, 2014 (DE) .................. 10 2014 209 444

(51) Int. Cl.
| | | |
|---|---|---|
| *H01M 10/00* | (2006.01) | |
| *H01M 2/20* | (2006.01) | |
| *H01M 2/10* | (2006.01) | |
| *H01M 10/613* | (2014.01) | |
| *H01M 10/6551* | (2014.01) | |
| *H01M 10/6561* | (2014.01) | |

(52) U.S. Cl.
CPC ......... *H01M 2/204* (2013.01); *H01M 2/1022* (2013.01); *H01M 10/613* (2015.04); *H01M 10/6551* (2015.04); *H01M 10/6561* (2015.04); *H01M 2220/30* (2013.01); *Y10T 29/49108* (2015.01)

(58) Field of Classification Search
CPC ........ H01M 2/20; H01M 2/202; H01M 2/204; H01M 2/1022; H01M 2/1055; H01M 2/105; H01M 10/60; H01M 10/61; H01M 10/613; H01M 10/65; H01M 10/655; H01M 10/6551

See application file for complete search history.

(56) References Cited

U.S. PATENT DOCUMENTS

| | | | |
|---|---|---|---|
| 2007/0132429 A1* | 6/2007 | Onuki .................. | H01M 2/1016 320/116 |
| 2012/0021260 A1* | 1/2012 | Yasui .................. | F28D 15/0275 429/53 |
| 2012/0082887 A1* | 4/2012 | Ninomiya ................ | H01G 9/08 429/159 |
| 2012/0135296 A1* | 5/2012 | Itoi ....................... | H01M 2/105 429/159 |

\* cited by examiner

*Primary Examiner* — Nicholas P D'Aniello
(74) *Attorney, Agent, or Firm* — Norton Rose Fulbright US LLP; Gerard Messina

(57) ABSTRACT

A handheld power tool battery pack includes a plurality of battery cells, which have a positive cell pole at one end and a negative cell pole at an opposite end, connecting conductors which are provided for electrically connecting the battery cells, a connecting side, and a side opposite the connecting side. The battery cells have one integrated cell connector which is provided for the purpose of making one of the cell poles of the battery cell electrically connectably available at the end of the other cell pole of the battery cell, and that the connecting conductors for electrically connecting the battery cells are situated only on the connecting side.

10 Claims, 13 Drawing Sheets

HANDHELD POWER TOOL BATTERY PACK

RELATED APPLICATION INFORMATION

The present application claims priority to and the benefit of German patent application no. 10 2013 211 459.1, which was filed in Germany on Jun. 19, 2013, the disclosure of which is incorporated herein by reference.

BACKGROUND INFORMATION

A handheld power tool battery pack has been provided which includes a plurality of battery cells having a positive cell pole at one end and a negative cell pole at an opposite end, connecting conductors which are provided for electrically connecting the battery cells, a connecting side and a side opposite the connecting side, in particular a bottom side.

SUMMARY OF THE INVENTION

The present invention is directed to a handheld power tool battery pack which includes a plurality of battery cells having a positive cell pole at one end and a negative cell pole at an opposite end, connecting conductors which are provided for electrically connecting the battery cells, a connecting side and a side opposite the connecting side, in particular a bottom side.

It is provided that the battery cells have an integrated cell connector which is provided for the purpose of making one of the cell poles of the battery cell electrically connectably available at the end of the other cell pole of the battery cell and that the connecting conductors for electrically connecting the battery cells are situated only on the connecting side. In this context, a "handheld power tool battery pack" is, in particular, to be understood to mean a battery pack having a plurality of battery cells which is provided for supplying a handheld power tool with power. It is, however, also possible that battery packs for other battery-operated devices, e.g., in particular, computers, lighting devices, audio and/or video devices have the features according to the present invention. In this context, a "handheld power tool" is, in particular, to be understood to mean an electrical device which is handheld by a user, e.g., a drill, a percussion drill, a saw, a planer, a screwdriver, a milling machine, a grinder, an angle grinder and/or a multifunction tool or a gardening tool, e.g., a hedge, shrub and/or grass trimmer.

In this context, a "battery cell which has a positive cell pole at one end and a negative cell pole at an opposite end" is, in particular, to be understood to mean a battery cell having a galvanic cell, in particular a secondary cell, which is constructed in such a way that one cell pole is positioned at one end and another cell pole is positioned at an opposite end. The battery cells may be configured as NiCd or NiMh battery cells, which may particularly be as lithium-based battery cells. The battery cell may be configured as an at least essentially cylindrical round cell, the cell poles being situated at the ends of the cylinder shape. In one variant of the present invention, it is also possible that a battery cell has two or more galvanic cells in one series circuit for the purpose of increasing an operating voltage of the battery cell, the galvanic cells being lined up along an axis of symmetry which extends through the cell poles. In this context, "electrically connecting" is, in particular, to be understood to mean a series circuit for increasing the voltage and/or a parallel circuit for increasing the capacity of the battery cells and/or an electrical connection of the battery cells with a charging and/or monitoring electronics system. The handheld power tool battery pack may have a plurality of battery cells within one series circuit, in particular 3, 4, 5, or 10 battery cells. The handheld power tool battery pack may have multiple groups of battery cells within one parallel circuit, each having battery cells within one series circuit. In particular, the handheld power tool battery pack may have two or more groups of battery cells, each of which being formed from 3, 4, 5, or 10 battery cells within one series circuit.

By using two or three groups of battery cells, it is possible in a particularly simple manner to produce variants of the handheld power tool battery pack which have the same voltage and twice or three times the capacity as compared to a standard configuration having one group of battery cells. The number of battery cells and the circuit type may be suitably selected as a function of the required voltage and/or capacity. In this context, an "integrated cell connector" is, in particular, to be understood to mean a cell connector which forms one unit with the galvanic cell and is fixedly connected thereto. The cell connector may be welded to one of the cell poles of the battery cell, in particular to the cell pole at the end of the battery cell which faces away from the connecting side. The cell connector may be formed at least largely from a metal, in particular, copper or nickel or a copper alloy or a nickel alloy. In applications for which only a small cable cross section is needed, it is, in particular, also possible for the cell connector to be formed from a foil conductor and/or a flat conductor. The cell connector may be connected to an outer surface of the galvanic cell along a longitudinal extension. The cell connector may be glued and/or welded to the outer surface of the galvanic cell. The cell connector may cover a major part of the outer surface of the galvanic cell. In particular, the cell connector may enclose the galvanic cell around its longitudinal extension by at least 180°. The cell connector may have a particularly large cable cross section.

In another embodiment, the cell connector may have a sleeve-shaped section, which surrounds the galvanic cell, along the longitudinal extension of the galvanic cell. The cell connector may be suited to transfer particularly high currents. The cell connector may have a particularly large surface. The cell connector is able to transfer a particularly large heat quantity in a direction which is perpendicular to its surface. The cell connector is able to dissipate lost heat which emerges due to electric currents in the cell connector particularly well via its surface. An assembly and/or an electrical wiring of the handheld power tool battery pack may be particularly easy. The battery cells must be electrically connected only on one side of the handheld power tool battery pack. An assembly of the handheld power tool battery pack may be particularly easily automatable.

It is furthermore provided that the battery cells are situated in the same polarity direction. In this context, "situated in the same polarity direction" is, in particular, to be understood to mean that the positive and the negative cell poles of the galvanic cells of the battery cells are each situated next to one another in an assembled state of the handheld power tool battery pack. The battery cells may be advantageously mounted in the same mounting direction during one assembly operation of the handheld power tool battery pack. A series or a parallel circuit of the battery cells may only be possible with the aid of correspondingly adapted connecting conductors on the connecting side.

Furthermore, a cell holder is provided having recesses, in each of which at least one battery cell is situated. The recesses may each accommodate multiple battery cells which are situated either in parallel or in series with respect to the longitudinal extension of the recesses. The recesses may each accommodate one battery cell. The battery cells are able to transfer lost heat to the cell holder particularly well via their outer surface. The recesses advantageously have the shape of a cylinder. In the cell holder, the recesses are advantageously situated in one row or in multiple rows and/or in a matrix arrangement. Other arrangements are also conceivable, in particular an arrangement of recesses in a triangle arrangement, one recess being situated at each corner of the triangle. The recesses advantageously have an inner diameter which is adapted to an outer diameter of the battery cells, so that the battery cells may be inserted into the recesses with a small clearance.

In this context, "small clearance" is, in particular, to be understood to mean a clearance of less than 1 mm, which may be less than 0.1 mm. The battery cells may be mounted free of mechanical stresses. The battery cells are able to transfer heat to the cell holder particularly well. The heat emerging due to electrical losses of the battery cells may be dissipated particularly well by the battery cells. The cell holder may be produced from a plastic, which may be from a metal, however. The thermal conductivity of the cell holder may be particularly great. The heat dissipation from the battery cell through the cell holder may be particularly good. A thermal balancing of the battery cells may be particularly good, so that a temperature of the battery cells may be similar.

It is furthermore provided that position holders are situated at the battery cells which are provided for the purpose of positioning the battery cells. The position holders may be provided for the purpose of positioning the battery cells in the recesses of the cell holder. In this context, "positioning" is, in particular, to be understood to mean mounting in a defined position and/or orientation. The position holders may be provided for insulating the galvanic cell of the battery cell against the cell holder. The battery cell may be supported by the position holder in the recess of the cell holder. An outer wall of the galvanic cell which is electrically conductive and connected to one of the cell poles may be contact-free with respect to the cell holder at least in the assembled state. In this context, "contact-free" is, in particular, to be understood to mean the lack of an immediate contact, in particular an electrical contact. An electrical short-circuit of the battery cells due to the cell holder may thus be prevented. The cells may be, in particular, fixed centrically with regard to the galvanic cell of the battery cell in the recesses of the cell holder. A deviation of a cross section of the battery cells from circular cross sections through the cell connector may be compensated for. The battery cells may be mounted centrically in the cylindrical recesses of the cell holder.

The cell connectors of the battery cells may have contact points which are provided for individual cell monitoring. The contact points for individual cell monitoring may have a smaller cable cross section than the contact points which are provided for the series and/or parallel circuit of the battery cells. A charging and/or discharge electronics system may separately monitor the battery cells. An overcharging and/or a total discharge of the battery cells may be prevented. A running of cables for individual cell monitoring may be particularly simple. Separate cables for individual cell monitoring may be dispensed with.

Furthermore, an electronic module is provided which is situated on the connecting side. The electronic module may, in particular, have a printed circuit board. The connecting conductors may be formed largely, advantageously exclusively, from the electronic module, in particular from the printed conductor tracks of the electronic module. The connecting conductors are particularly advantageously formed from contact points of the cell connectors between circuitry-wise adjacent battery cells. The contact points of the cell connectors may be bent in the direction of the particular circuitry-wise adjacent battery cell in such a way that they contact that cell pole of the adjacent battery cell which faces the connecting side. The cell poles and/or the cell connectors, which face the electronic module, of the circuitry-wise first and last battery cells may be electrically connected to the contact points of the electronic module, which may be by soldering and/or a contact force.

Separate connecting conductors, in particular cables and/or wires, may be dispensed with. The connecting conductors may be formed from those sections of the cell connectors which lie on the connecting side. An assembly of the handheld power tool battery pack may be particularly easy and/or well automatable. On its side facing away from the battery cells, the electronic module may have an interface which is provided for contacting the handheld power tool battery pack with a handheld power tool. The interface may be an integral part of the electronic module. An assembly of the handheld power tool battery pack may be particularly simple. Depending on the configuration of the handheld power tool battery pack and an accommodation area for the handheld power tool battery pack in a handheld power tool, it may also be advantageous that the interface is situated on another side of the handheld power tool battery pack and electrically connected to the electronic module. The electronic module may have a battery cell protective circuit. The battery cell protective circuit is particularly may be connected to the contact points for individual cell monitoring. The battery cell protective circuit may be provided for preventing the battery cells from overcharging and/or from totally discharging. The electronic module particularly may monitor the temperature of the handheld power tool battery pack and/or of the battery cells. Damage and/or premature aging of the battery cells due to electrical and/or thermal overload may be prevented. The handheld power tool battery pack may be particularly durable and/or fail-safe.

Furthermore, a cooling element is provided which is situated on the side opposite the connecting side, in particular the bottom side, of the handheld power tool battery pack. In this context, a "cooling element" is, in particular, to be understood to mean an element which is able to dissipate a particularly large amount of heat to an environment. The cooling element may have a surface which is enlarged by cooling fins. The cooling element may be at least essentially formed from a material having a great thermal conductivity, in particular a metal. The cooling element may be situated on a side of the cell holder which faces away from the connecting side. The battery cells are able to transfer heat particularly well to the cooling element via the cell holder.

In one embodiment of the present invention, it is provided that the battery cells are at least partially embedded in a casting compound. The battery cells may be cast with the casting compound after being inserted into the recesses of the cell holder. The casting compound may have a low thermal resistance such as in the case of a silicone-based casting compound. The casting compound may fill the gaps between the battery cells and the cell holder. A heat transfer from the battery cells to the cell holder may be particularly good. The battery cells are able to transfer heat particularly well. The cell poles and/or the connecting conductors and/or the electronic module may be at least partially embedded in the casting compound. Humidity and/or fluids may be prevented from entering. The battery cells, cell connectors, and connecting conductors may be protected against humidity. Corrosion and/or fault currents and/or short-circuits may be prevented. The handheld power tool battery pack may be particularly robust and fail-safe.

Furthermore, an upper part is provided which is used for fixing the battery cells in the cell holder and/or for mounting the electronic module. The upper part may have a receiving area for the electronic module. The upper part may have a latching arrangement which is provided for connecting the upper part to the cell holder with the aid of a latching connection. An assembly of the handheld power tool battery pack may be particularly simple. The handheld power tool battery pack may have a cover which delimits the handheld power tool battery pack on the connecting side to the outside. The cover may have a recess for the interface with a handheld power tool.

Moreover, a battery cell is provided which has a cell connector and/or a position holder for a handheld power tool battery pack. The battery cell may be manufactured as a preassembled module. The battery cell may be, in particular, suitable for insertion into a handheld power tool battery pack.

Furthermore, a method is provided for manufacturing a handheld power tool battery pack. In particular, the method may have the steps of inserting battery cells having a cell connector into a cell holder, of fixing them with the aid of an upper part and casting them using a casting compound, of placing an electronic module on the connecting side onto the cell holder having the battery cells and of electrically connecting the battery cells, and of situating a cooling element on the side opposite the connecting side, in particular the bottom side, of the cell holder.

The handheld power tool battery pack described above and the battery cell described above are an idealization. The present invention, however, also includes handheld power tool battery packs and battery cells which deviate from this idealized form within the scope of manufacturing tolerances.

The handheld power tool battery pack according to the present invention and the battery cell according to the present invention are not to be limited to the applications and specific embodiments described above. In particular, the handheld power tool battery pack according to the present invention and the battery cell according to the present invention may have a number of individual elements, components, and units which deviates from the number named here for the purpose of achieving a functionality described herein.

Further advantages result from the following description of the drawings. The drawings illustrate exemplary embodiments of the present invention. The drawings, the description, and the claims contain numerous features in combination. Those skilled in the art will advantageously also consider the features individually and combine them to form other reasonable combinations.

DETAILED DESCRIPTION

Figure 1:
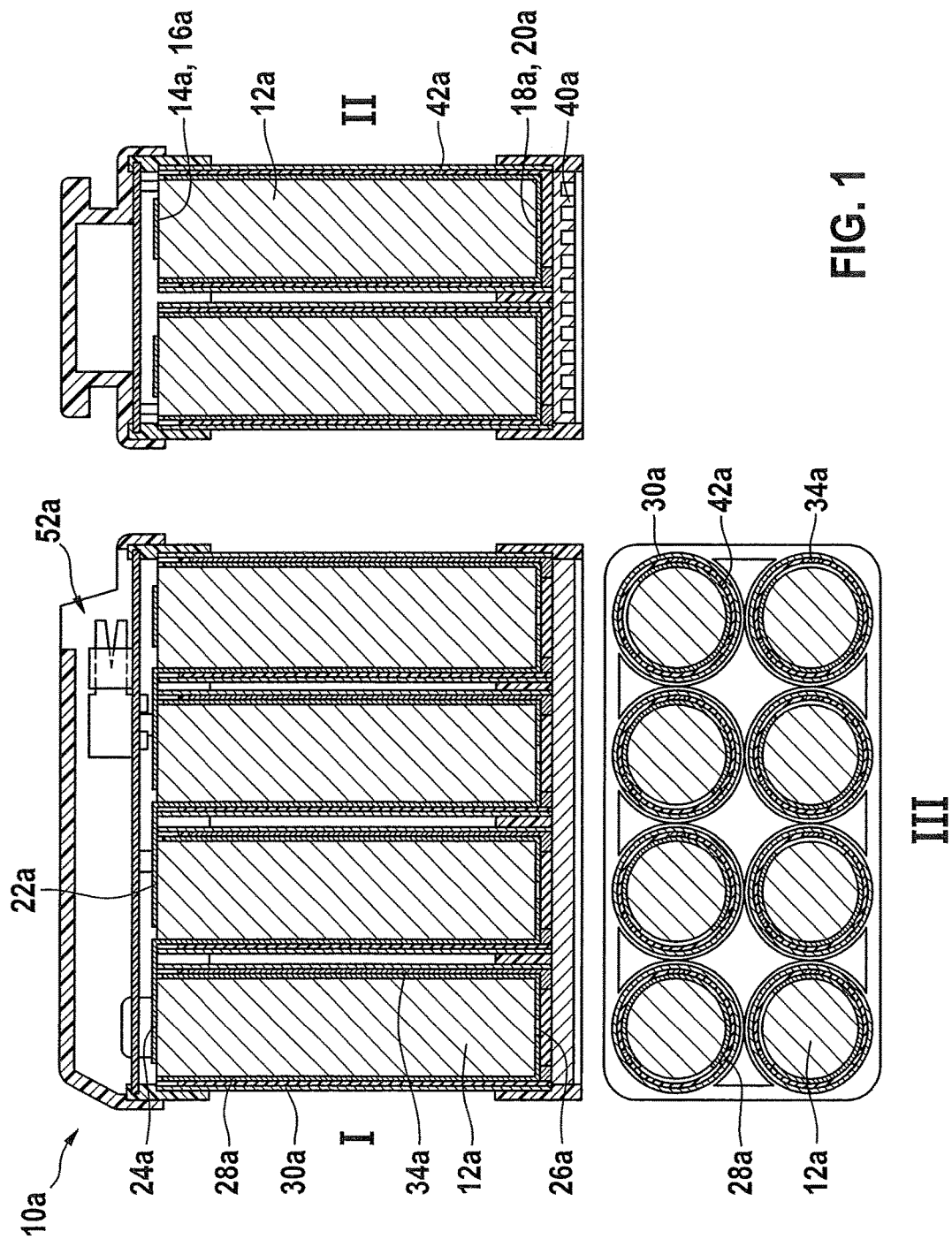
FIG. 1 shows a schematic illustration of three sections through a handheld power tool battery pack according to the present invention.
Figure 2:
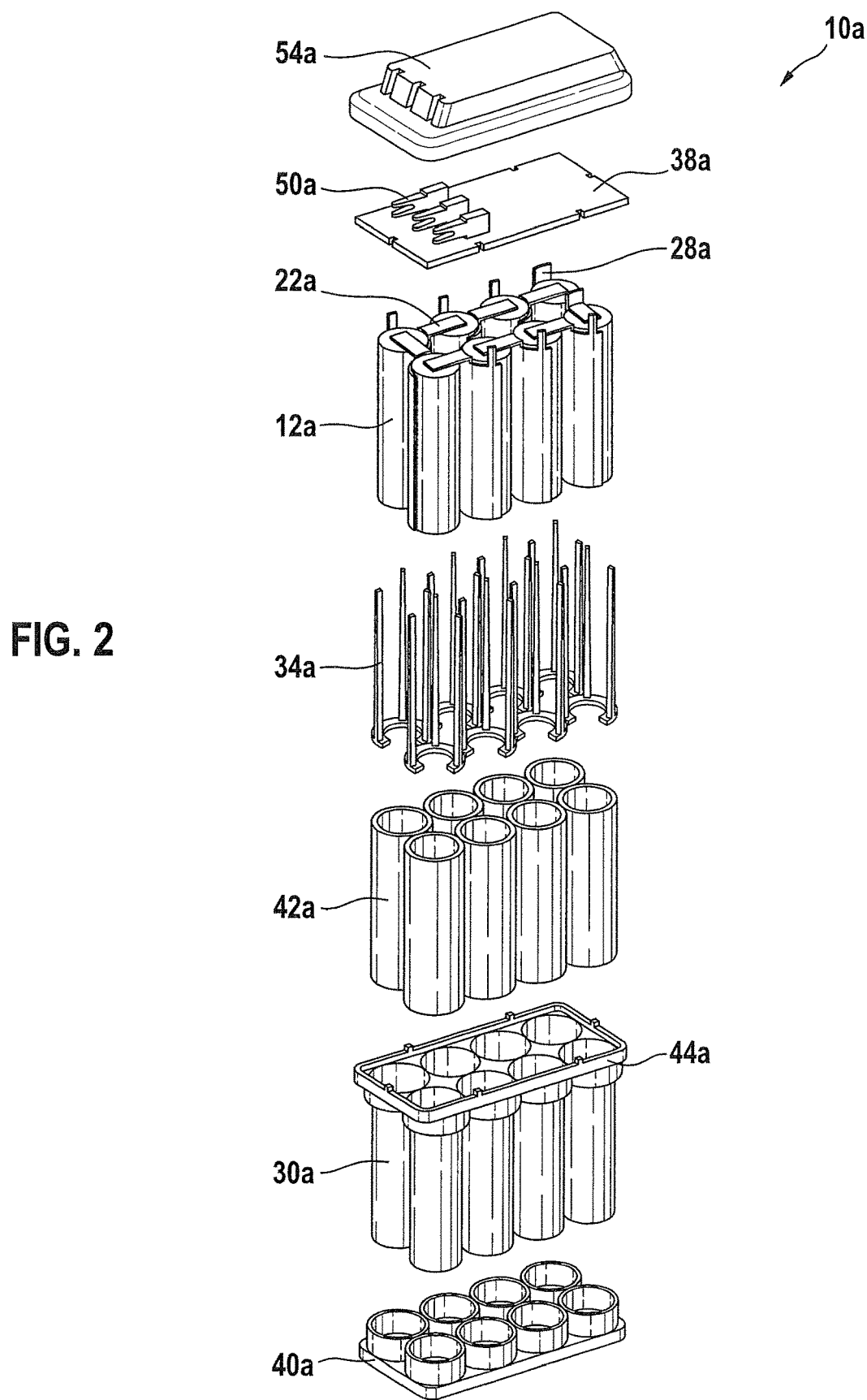
FIG. 2 shows an exploded drawing of the handheld power tool battery pack according to the present invention.

FIG. 1 shows a schematic illustration of three sections I, II, and III through a handheld power tool battery pack 10a having eight battery cells 12a in a series circuit which have a positive cell pole 16a at one end 14a and a negative cell pole 20a at an opposite end 18a, connecting conductors 22a (FIG. 2) which are provided for electrically connecting battery cells 12a, a connecting side 24a and a side opposite connecting side 24a, a bottom side 26a in the present case.

Handheld power tool battery pack 10a has a cell holder 30a including recesses 32a formed from eight cylindrical metal sleeves (FIG. 5), in each of which a battery cell 12a is situated. Cell holder 30a including the eight metal sleeves may, for example, be deep-drawn or extruded. These eight battery cells 12a in cell holder 30a are situated in the same polarity direction, positive cell pole 16a being situated on connecting side 24a. Battery cells 12a are embedded in cell holder 30a in a silicone-based, thermally conductive casting compound 42a for the purpose of ensuring good heat transfer from battery cells 12a to cell holder 30a and protecting battery cells 12a against humidity and/or fluids. On the side opposite connecting side 24a, bottom side 26a in the present case, a cooling element 40a having cooling fins is situated at cell holder 30a, so that lost heat emerging in handheld power tool battery pack 10a, in particular in battery cells 12a, may be dissipated into an environment at a reduced thermal resistance.

Figure 3:
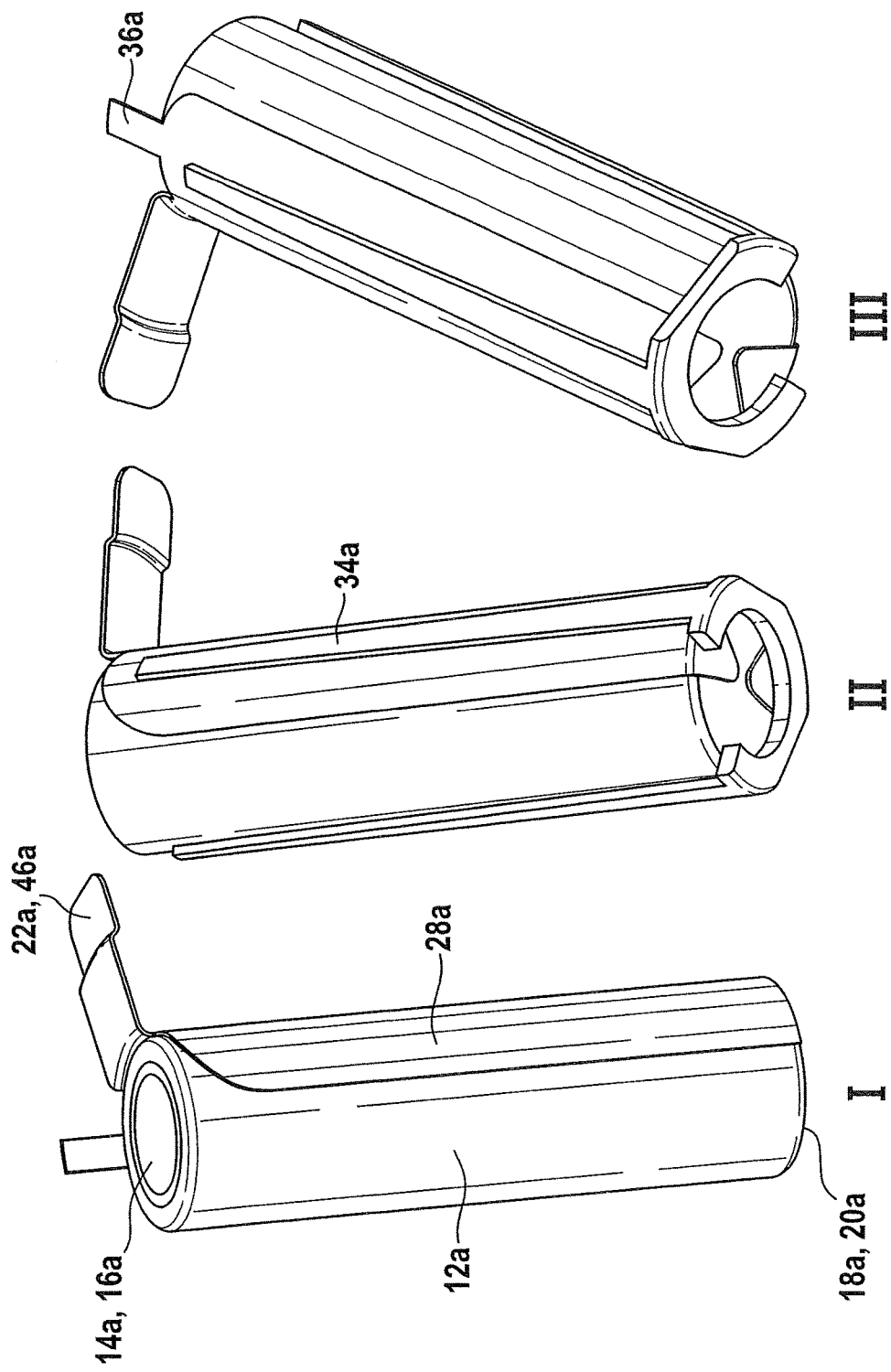
FIG. 3 shows a schematic illustration of a battery cell for the handheld power tool battery pack in three views.
Figure 4:
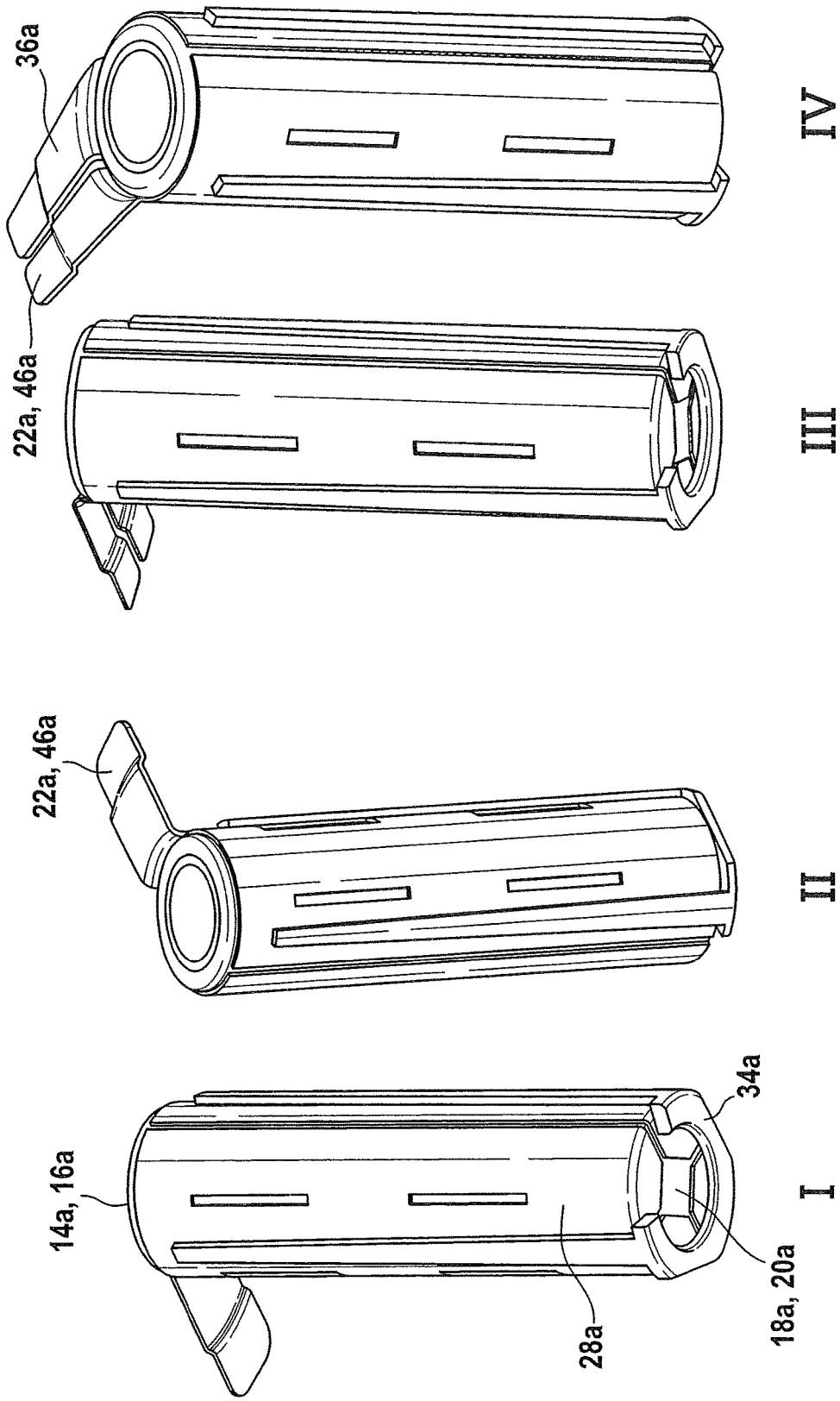
FIG. 4 shows a schematic illustration of two additional variants of a battery cell for the handheld power tool battery pack in two views in each case.

Battery cells 12a have cylindrical, lithium-based galvanic round cells and an integrated cell connector 28a in each case which is provided for making negative cell pole 20a of battery cell 12a electrically contactably available at end 14a of positive cell pole 16a of battery cell 12a (FIGS. 3 and 4). FIG. 3-I shows a first variant of a battery cell 12a having cell connector 28a. Cell connector 28a is formed from a copper strip. Cell connector 28a is welded to negative cell pole 20a and glued to a cylindrical surface of battery cell 12a with the aid of a thermally conductive glue for the purpose of ensuring good heat transfer between battery cell 12a and cell connector 28a. The battery cell of FIG. 3-I is, in particular, suitable for use together with a cell holder 30a which has an electrical insulation in its recesses 32a. FIG. 3-II shows a second variant of a battery cell 12a, a position holder 34a, which is provided for positioning battery cell 12a as well as for electrically insulating battery cell 12a against cell holder 30a, being additionally situated at battery cell 12a. Position holder 34a ensures a centrical position of battery cell 12a in cell holder 30a and compensates for a nonuniform periphery of battery cell 12a with the aid of a thickness of cell connector 28a perpendicular to the cylindrical surface of battery cell 12a. FIG. 3-III shows the third variant of battery cell 12a including position holder 34a which was used in the first exemplary embodiment; in this variant, cell connector 28a of battery cell 12a has a contact point 36a which is provided for individual cell monitoring. Cell connector 28a encloses the round cell of battery cell 12a around its longitudinal axis by more than 180°. Contact points 36a which are used only to measure the voltage in battery cells 12a have a smaller cross section than a contact point 46a which is provided for a series and/or a parallel circuit of battery cell 12a and conducts a charging and/or discharge current of battery cell 12a during operation. Battery cell 12a shown in FIG. 3-III is the one shown in the other FIGS. 1, 2, and 5 through 7 of the first exemplary embodiment.

In FIGS. 4-I and 4-II, another variant of battery cell 12a is illustrated which includes a cell connector 28a having a particularly large cross section which covers almost the entire cylindrical surface of battery cell 12a. In FIG. 4-III and FIG. 4-IV, cell connector 28a having the large cross section additionally includes two contact points 36a, 46a, thus enabling individual cell monitoring of battery cells 12a. Cell connectors 28a of battery cells 12a illustrated in FIGS. 4-I through 4-IV are particularly suitable for high-power applications. Battery cells 12a including cell connectors 22a and position holders 34a form preassembled modules for manufacturing handheld power tool battery pack 10a.

Connecting conductors 22a for electrically connecting battery cells 12a are situated only on connecting side 24a of handheld power tool battery pack 10a and are formed from the sections of cell connectors 28a which are situated on connecting side 24a. Connecting conductors 22a are formed from the ends of cell connectors 28a which form contact points 46a and which are folded in the direction of a circuitry-wise adjacent battery cell 12a in such a way that they contact particular positive cell pole 16a of this battery cell 12a, so that circuitry-wise adjacent battery cells 12a are electrically connected in a series circuit. Free positive cell pole 16a and free contact point 46a of first or last battery cells 12a of the series circuit form a positive battery pole 56a and a negative battery pole 58a (FIG. 5-III) and are connected to the contacts of an electronic module 38a. In addition, electronic module 38a contacts contact points 36a for individual cell monitoring of battery cells 12a. Electronic module 38a has a printed circuit board 48a as well as components of a protective circuit which is provided for delimiting cell voltages of battery cells 12a to a range between an end-of-charge voltage and an end-of-discharge voltage. Furthermore, electronic module 38a has contacts 50a of an interface 52a which are provided for connecting handheld power tool battery pack 10a to a handheld power tool. Interface 52a is situated on connecting side 24a of handheld power tool battery pack 10a.

An upper part 44a is used for fixing battery cells 12a in cell holder 30a and for mounting electronic module 38a. Upper part 44a is plugged onto cell holder 30a from connecting side 24a and receives electronic module 38a also from connecting side 24a. A cover 54a which has a recess for interface 52a closes off handheld power tool battery pack 10a on connecting side 24a.

Figure 5:
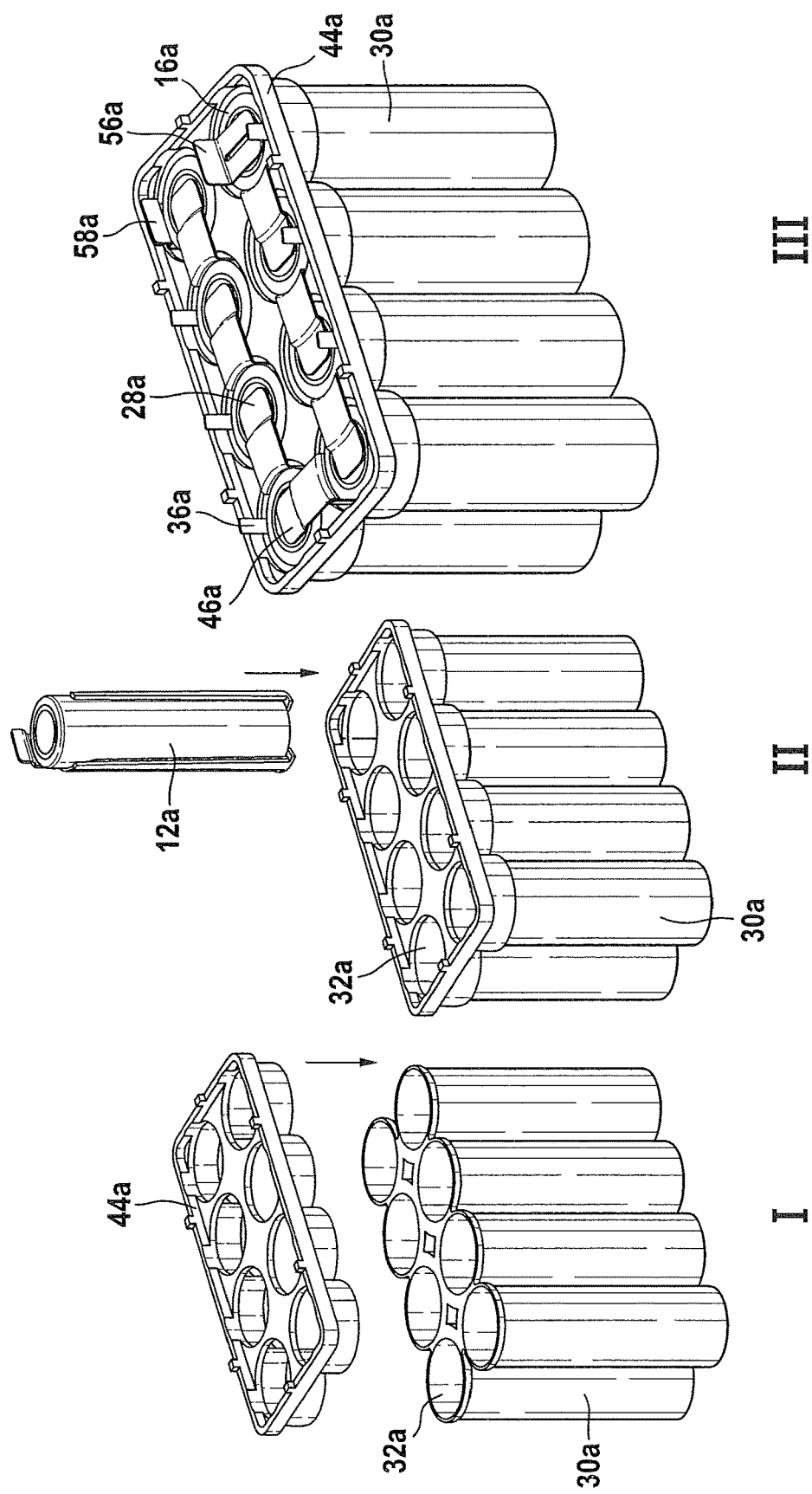
FIG. 5 shows a schematic illustration of three method steps for manufacturing the handheld power tool battery pack.
Figure 6:
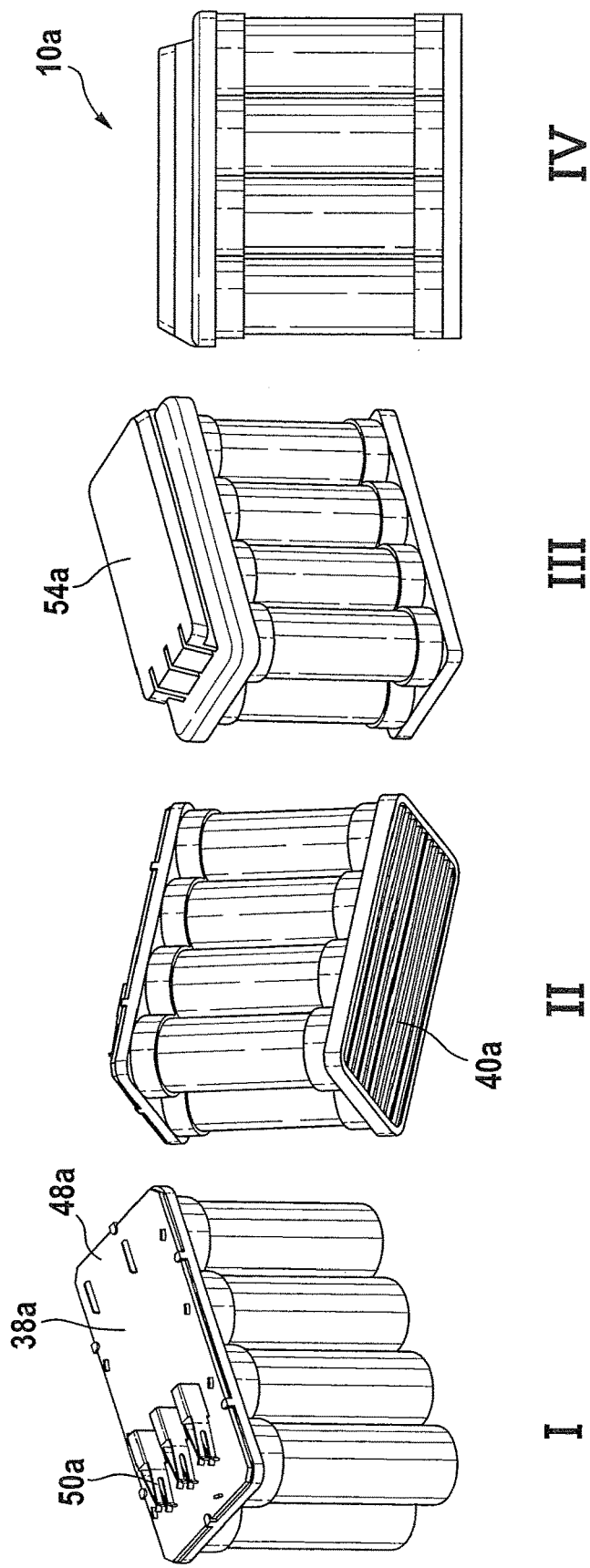
FIG. 6 shows a schematic illustration of three additional method steps for manufacturing the handheld power tool battery pack.

FIGS. 5 and 6 describe a method for manufacturing handheld power tool battery pack 10a: In a first method step (FIG. 5-I), upper part 44a is placed on cell holder 30a. In another method step (FIG. 5-II), battery cells 12a are inserted into recesses 32a of cell holder 30a. FIG. 5-III shows cell holder 30a together with inserted battery cells 12a and upper part 44a. Contact points 46a of cell connectors 28a of circuitry-wise adjacent battery cells 12a are folded onto positive cell poles 16a of adjacent battery cells 12a, so that battery cells 12a are connected in a series circuit. In battery cells 12a at the ends of the series circuit a positive battery pole 56a which is formed at one end of the series circuit from positive cell pole 16a of battery cell 12a remains free and a negative battery pole 58a which is formed at the other end of the series circuit from contact point 46a of battery cell 12a remains free. Battery cells 12a are already cast with casting compound 42a which is not illustrated in this figure. In an additional method step (FIG. 6-I), electronic module 38a is placed on upper part 44a. Electronic module 38a contacts positive battery pole 56a, negative battery pole 58a, and contact points 36a for individual cell monitoring. In another method step (FIG. 6-II), cooling element 40a is plugged onto cell holder 30a on the side opposite connecting side 24a, bottom side 26a in the present case. In another method step (FIG. 6-III), cover 54a is attached on connecting side 24a. FIG. 6-IV shows fully assembled handheld power tool battery pack 10a. Handheld power tool battery pack 10a is able to dissipate heat particularly well which emerges in battery cells 12a and cell connectors 28a due to electrical losses. Battery cells 12a and cell connectors 28a are in a direct contact with cell holder 30a or, through casting compound 42a, in an indirect contact with cell holder 30a. Cell holder 30a dissipates heat energy into the environment at its surface and through cooling element 40a if it heats up to a temperature which is higher than the ambient temperature.

Figure 7:
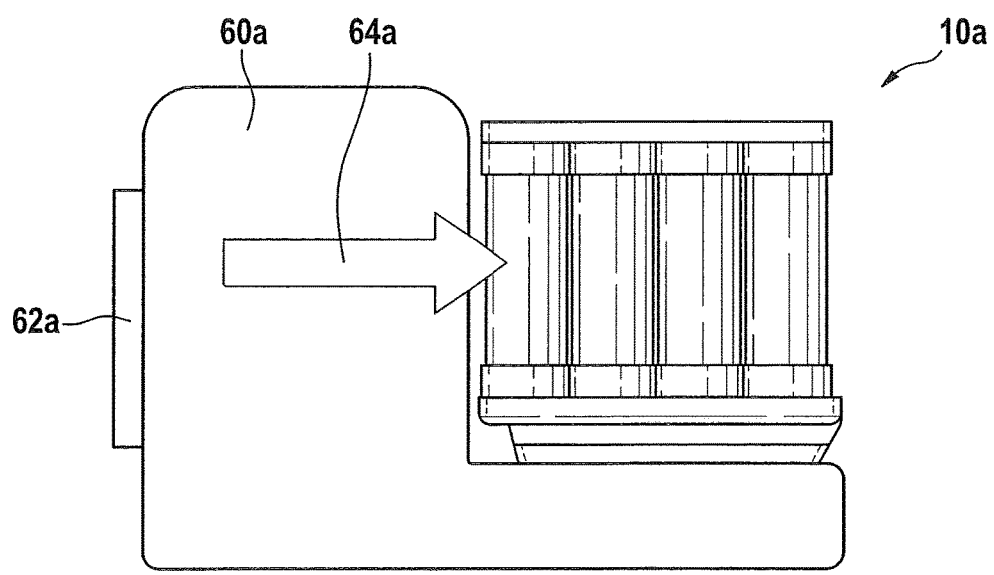
FIG. 7 shows a schematic illustration of a charging device for the handheld power tool battery pack.

FIG. 7 shows a charging device 60a which is provided for charging handheld power tool battery pack 10a. Charging device 60a has a blower 62a which generates a cooling air flow 64a. Cooling air flow 64a grazes cell holder 30a and cooling element 40a of handheld power tool battery pack 10a in such a way that handheld power tool battery pack 10a dissipates heat energy into cooling air flow 64a and a temperature of handheld power tool battery pack 10a is reduced.

FIGS. 8 through 13 show six additional exemplary embodiments of the present invention. The following description and drawing are essentially limited to the differences between the exemplary embodiments, it also being possible to make references with regard to identically identified components, in particular to components having identical reference numerals, basically also to the drawing and/or the description of the other exemplary embodiments, in particular of FIGS. 1 through 7. To differentiate between the exemplary embodiments, letter a is added after the reference numerals of the exemplary embodiment in FIGS. 1 through 7. In the exemplary embodiments of FIGS. 8 through 13, letter a is replaced by letters b through g.

Figure 8:
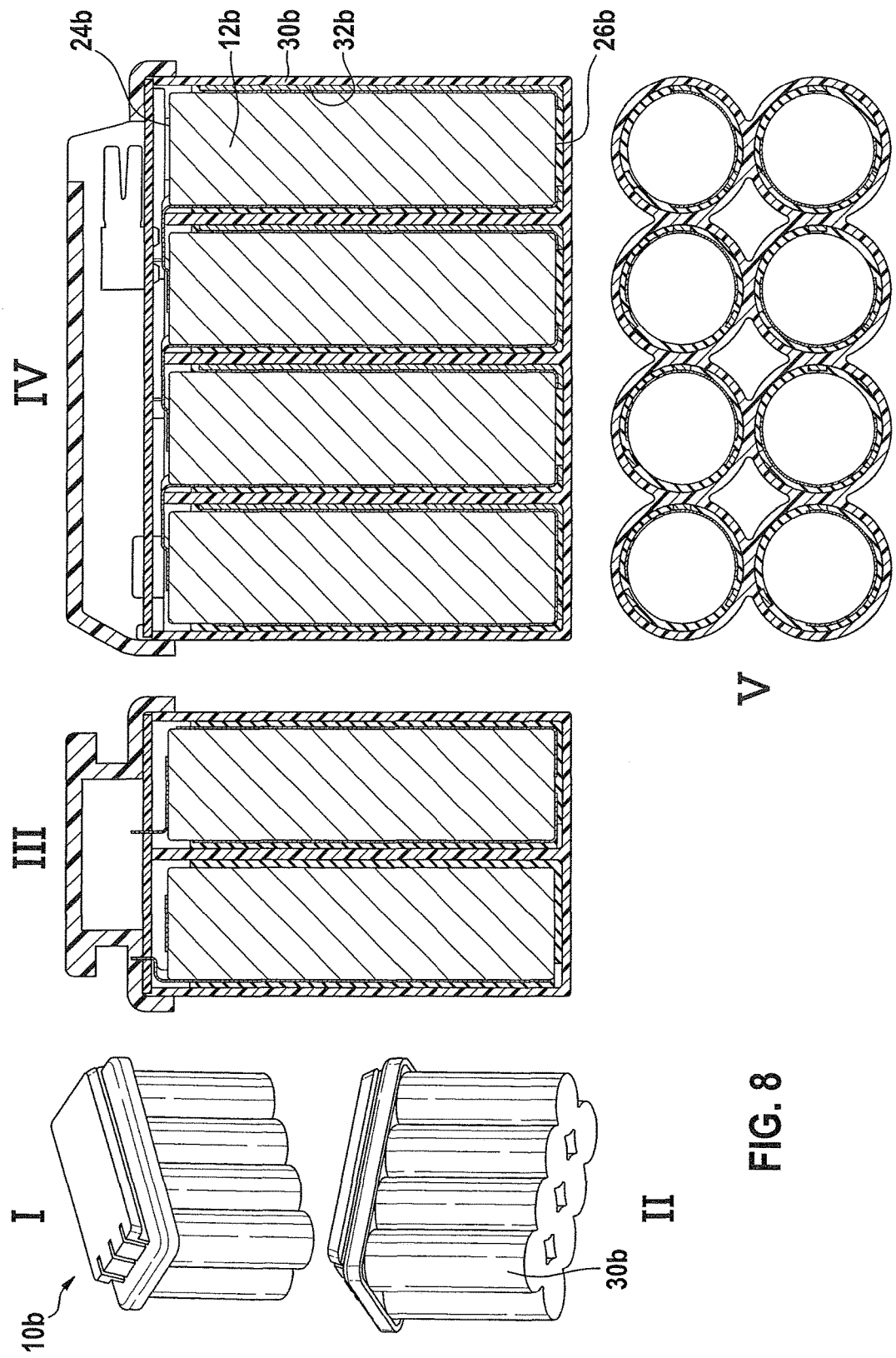
FIG. 8 shows a schematic illustration of a handheld power tool battery pack in a second exemplary embodiment in two views and three sectional illustrations.

FIG. 8 shows a handheld power tool battery pack 10b in a second exemplary embodiment. Handheld power tool battery pack 10b of the second exemplary embodiment differs from handheld power tool battery pack 10a in particular in that a cell holder 30b is manufactured from a plastic material. Cell holder 30b has recesses 32b for receiving battery cells 12b which are closed on a side opposite a connecting side 24b, bottom side 26b in the present case. A cooling element for closing off bottom side 26b of handheld power tool battery pack 10b is dispensed with. Handheld power tool battery pack 10b is particularly cost-effective and suitable for applications in which, compared to handheld power tool battery pack 10a, a lower heat dissipation of lost heat emerging in handheld power tool battery pack 10b is permissible.

Figure 9:
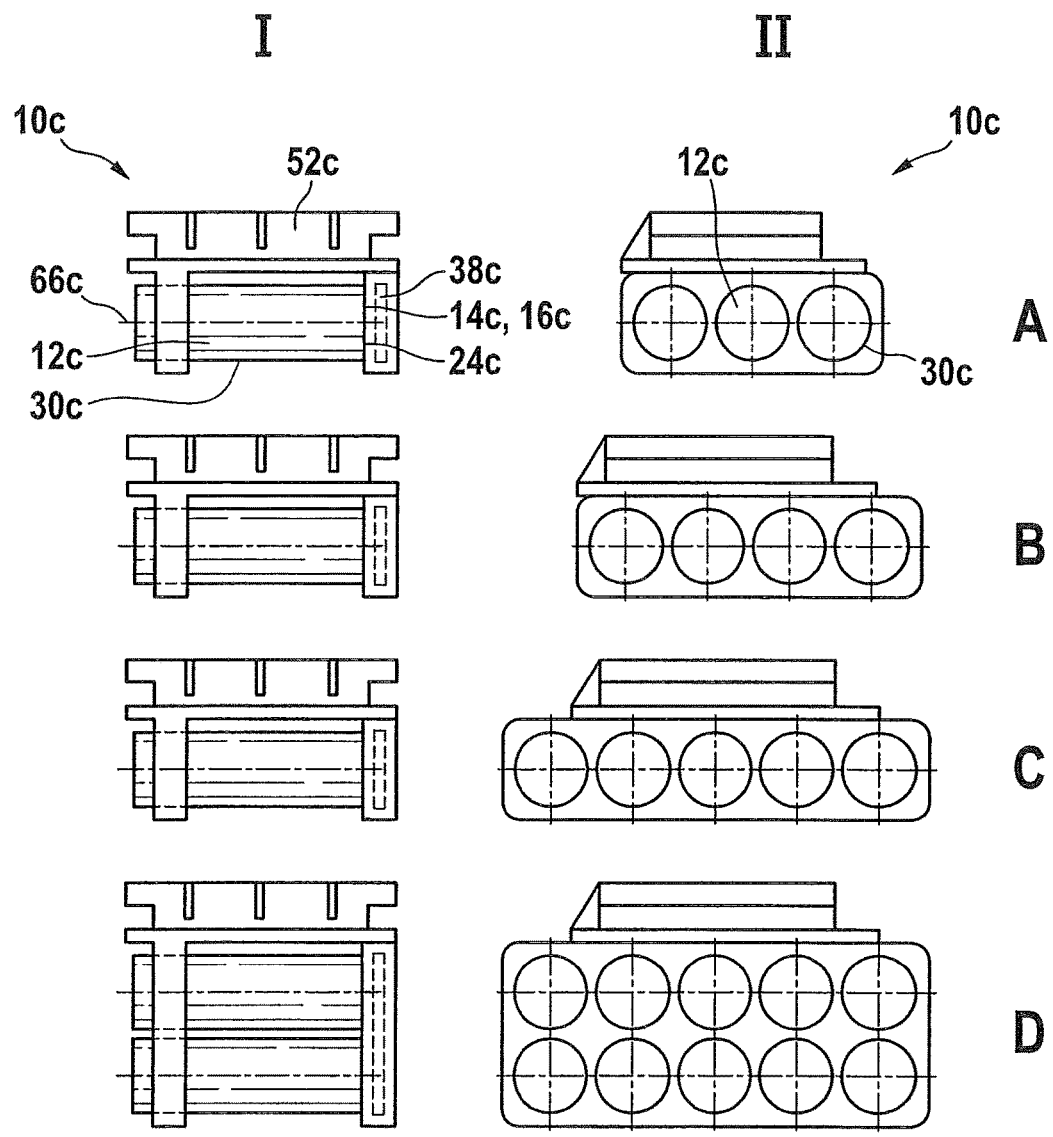
FIG. 9 shows a schematic illustration of a handheld power tool battery pack in a third exemplary embodiment in four variants in two views in each case.

FIG. 9 shows a handheld power tool battery pack 10c in a third exemplary embodiment in four variants A through D in two views I and II in each case. Handheld power tool battery pack 10c of the third exemplary embodiment differs from handheld power tool battery pack 10b of the second exemplary embodiment in particular in that an interface 52c for electrically connecting handheld power tool battery pack 10c to a handheld power tool is situated on a side of a cell holder 30c in parallel to axes of symmetry 66c of battery cells 12c. A connecting side 24c having an electronic module 38c is situated at an end 14c of battery cells 12c which has positive cell poles 16c. Variants A through D of handheld power tool battery pack 10c of the third exemplary embodiment differ in that they have 3, 4, 5 and 10 battery cells 12c, respectively, in a series circuit. Battery cells 12c of variants A through C are situated in one row, those of variant D are situated in two rows.

Figure 10:
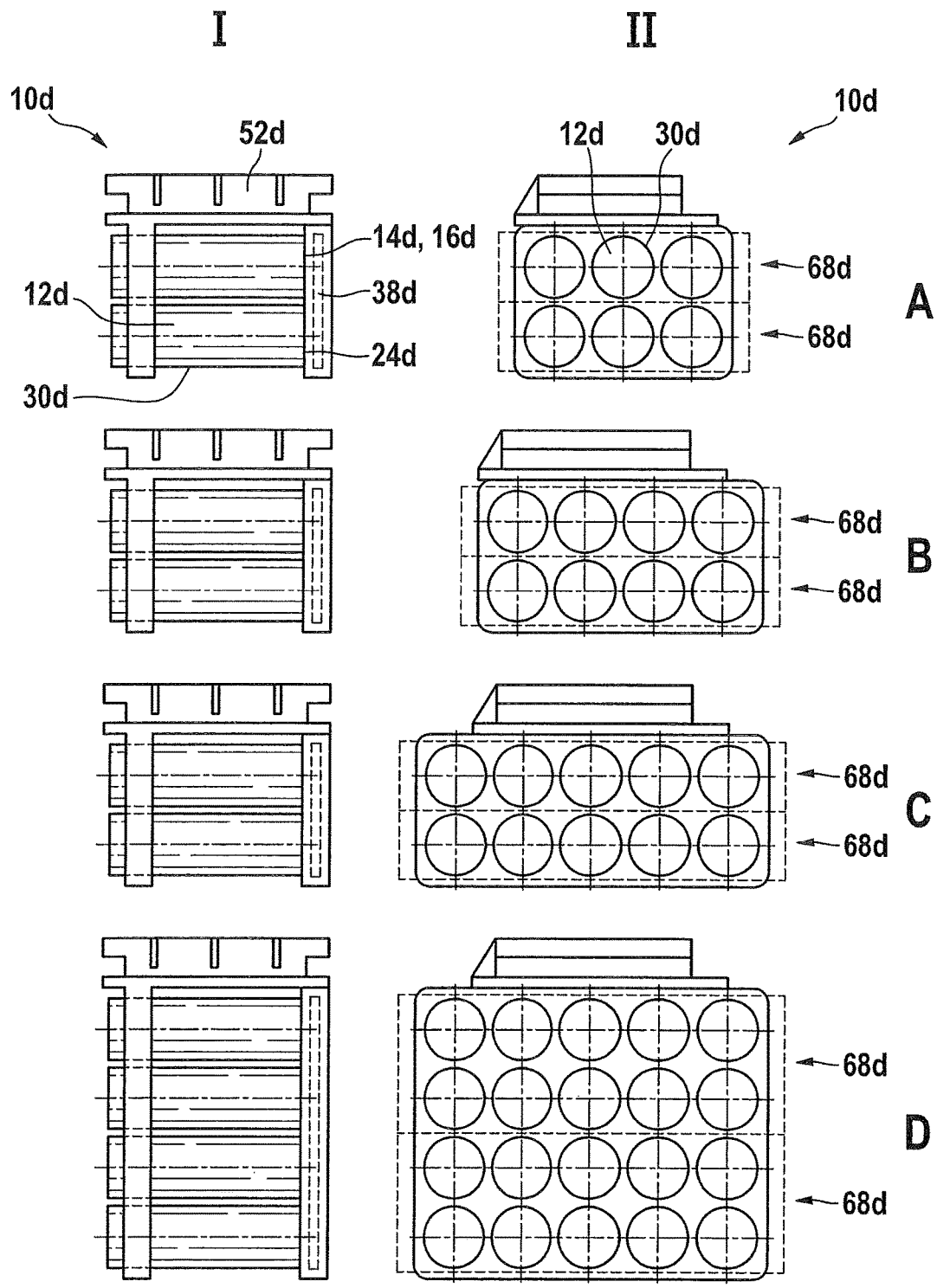
FIG. 10 shows a schematic illustration of a handheld power tool battery pack in a fourth exemplary embodiment in four variants in two views in each case.

FIG. 10 shows a handheld power tool battery pack 10d in a fourth exemplary embodiment in four variants A through D in two views I and II in each case. Handheld power tool battery pack 10d of the fourth exemplary embodiment differs from handheld power tool battery pack 10c of the third exemplary embodiment in particular in that the two groups 68d which are electrically connected in parallel are each formed from battery cells 12d which are connected in series. The two parallel-connected groups 68d of variant A have three battery cells 12d in a series circuit. The two parallel-connected groups 68d of variant B have four battery cells 12d in a series circuit. The two parallel-connected groups 68d of variant C have five battery cells 12d in a series circuit. The two parallel-connected groups 68d of variant D have ten battery cells 12d in a series circuit. Handheld power tool battery pack 10d has twice the capacity with regard to a handheld power tool battery pack having only one group of battery cells connected in series.

Figure 11:
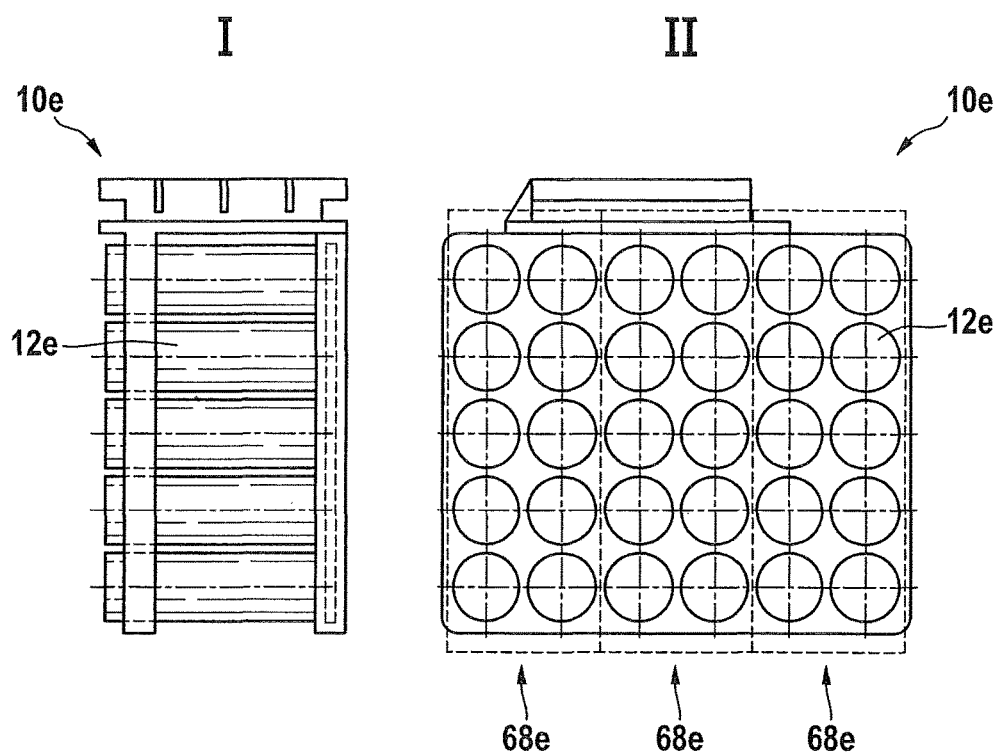
FIG. 11 shows a schematic illustration of a handheld power tool battery pack in a fifth exemplary embodiment.

FIG. 11 shows a handheld power tool battery pack 10e in a fifth exemplary embodiment in two views I and II. Handheld power tool battery pack 10e of the fifth exemplary embodiment differs from handheld power tool battery pack 10d of the fourth exemplary embodiment in particular in that three groups 68e which are electrically connected in parallel are each formed from 10 battery cells 12e which are connected in series. Handheld power tool battery pack 10e has three times the capacity with regard to a handheld power tool battery pack having only one group of battery cells connected in series.

Figure 12:
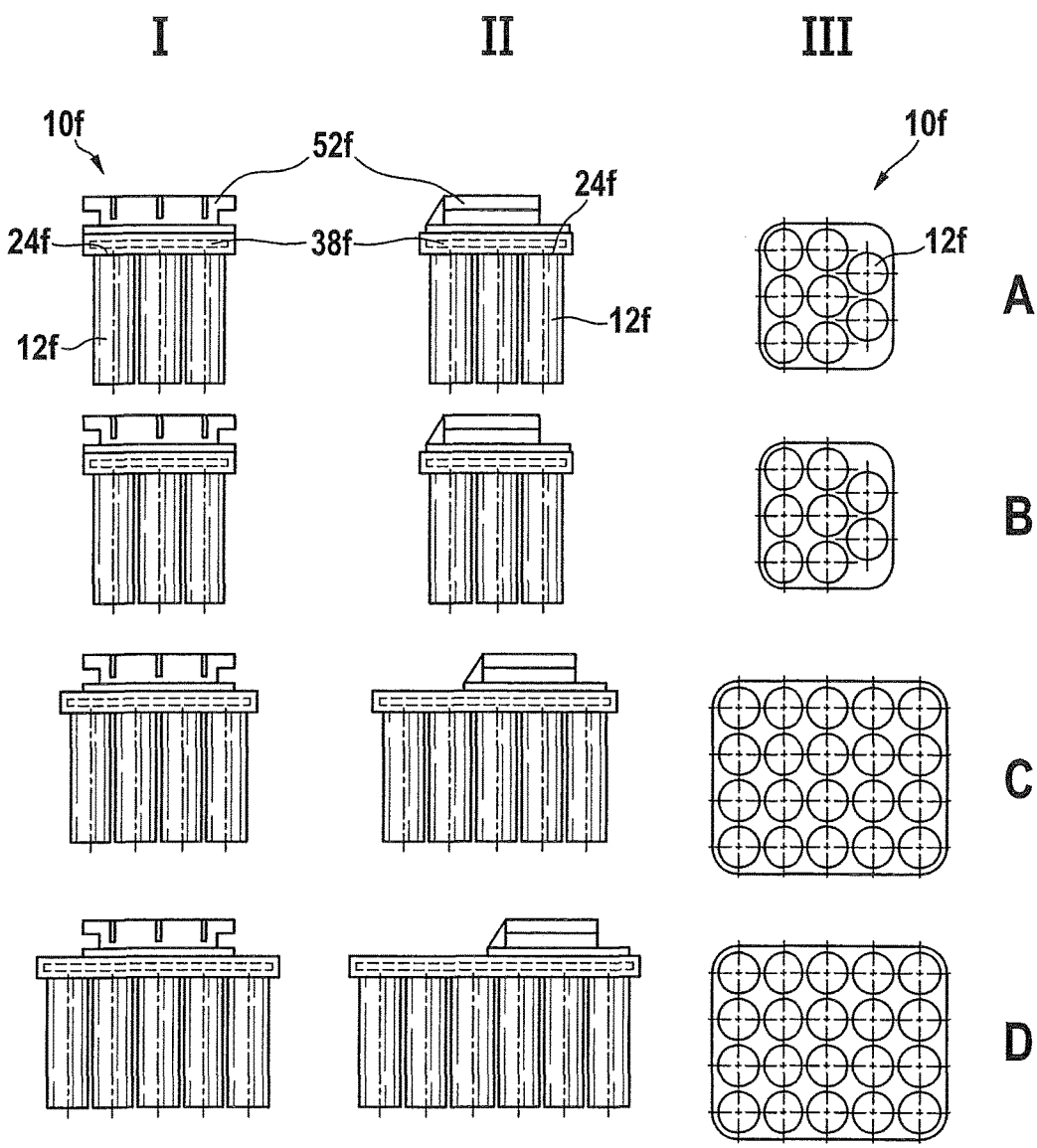
FIG. 12 shows a schematic illustration of a handheld power tool battery pack in a sixth exemplary embodiment in four variants in three views in each case.

FIG. 12 shows a handheld power tool battery pack 10f in a sixth exemplary embodiment in four variants A through D in three views I, II and III in each case. Handheld power tool battery pack 10f of the sixth exemplary embodiment differs from handheld power tool battery packs 10c, 10d, and 10e of the third, the fourth, and the fifth exemplary embodiments, respectively, in particular in that an interface 52f is situated on a connecting side 24f of handheld power tool battery pack 10f as in the first exemplary embodiment. Moreover, the connecting side has an electronic module 38f. FIG. 12-A shows a possible arrangement of eight battery cells 12f, FIG. 12-B shows a possible arrangement of eleven battery cells 12f, FIG. 12-C shows a possible arrangement of 20 battery cells 12f, and FIG. 12-D shows a possible arrangement of 30 battery cells 12f. Depending on a desired capacity and operating voltage, battery cells 12f may be situated in a series circuit or in parallel-connected groups of battery cells 12f in a series circuit, as in the third and the fourth exemplary embodiments.

Figure 13:
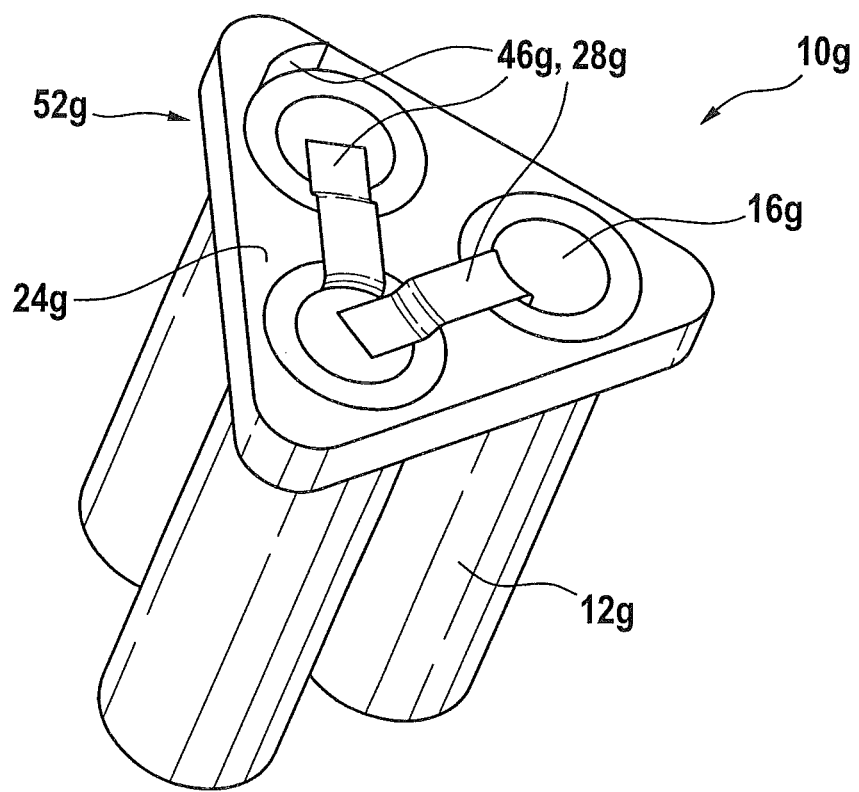
FIG. 13 shows a schematic illustration of a handheld power tool battery pack in a seventh exemplary embodiment.

FIG. 13 shows a handheld power tool battery pack 10g in a seventh exemplary embodiment. Handheld power tool battery pack 10g of the fifth exemplary embodiment differs from handheld power tool battery pack 10f of the sixth exemplary embodiment in particular through an alternative arrangement of three battery cells 12g in a triangular arrangement. Circuitry-wise central battery cell 12g is connected to battery cells 12g situated at the circuitry-wise ends via contact points 46g of cell connectors 28g. An interface 52g may be formed directly by a positive cell pole 16g and contact point 46g of circuitry-wise first and last battery cells 12g. Alternatively, as shown in the exemplary embodiments described above, an electronic module may be situated on a connecting side 24g together with interface 52g and/or interface 52g may be configured separately and electrically connected to battery cells 12g.

What is claimed is:

1. A handheld power tool battery pack, comprising:
   cylindrical battery cells, each of the cylindrical battery cells having a positive cell pole at one end and a negative cell pole at an opposite end,
   connecting conductors provided for electrically connecting at least two of the cylindrical battery cells,
   a connecting side, and
   a side opposite the connecting side;
   wherein each of the cylindrical battery cells has at least one integrated cell connector for making one of the cell poles of the cylindrical battery cell electrically connectably available at the end of the other cell pole of the cylindrical battery cell,
   wherein the connecting conductors are situated only on the connecting side,
   wherein the connecting conductors are formed from ends of the at least one integrated cell connector, which ends contact one of the cell poles,
   wherein the at least one integrated cell connector has at least one additional contact point,
   wherein the at least one integrated cell connector of a respective cylindrical battery cell encloses the respective cylindrical battery cell around its entire longitudinal axis by at least 180°.

2. The handheld power tool battery pack of claim 1, wherein the cylindrical battery cells are situated in the same polarity direction.

3. The handheld power tool battery pack of claim 1, further comprising:
   a cell holder having recesses in each of which at least one cylindrical battery cell of the cylindrical battery cells is situated.

4. The handheld power tool battery pack of claim 1, wherein position holders are situated at the cylindrical battery cells which are provided for the purpose of positioning the cylindrical battery cells.

5. The handheld power tool battery pack of claim 1, further comprising:
   an electronic module situated on the connecting side.

6. The handheld power tool battery pack of claim 1, further comprising:
   a cooling element situated on the side opposite the connecting side.

7. The handheld power tool battery pack of claim 1, wherein the cylindrical battery cells are at least partially embedded in a casting compound.

8. The handheld power tool battery pack of claim 1, further comprising:
an upper part for fixing the cylindrical battery cells in the cell holder and/or for mounting the electronic module.

9. A handheld power tool battery pack, comprising:
cylindrical battery cells, each of the cylindrical battery cells having a positive cell pole at one end and a negative cell pole at an opposite end,
connecting conductors provided for electrically connecting at least two of the cylindrical battery cells,
a connecting side, and
a side opposite the connecting side;
a cell holder having recesses in each of which at least one cylindrical battery cell is situated, wherein the recesses are formed from cylindrical metal sleeves, in each of which a cylindrical battery cell of the cylindrical battery cells is situated;
wherein each of the cylindrical battery cells has at least one integrated cell connector for making one of the cell poles of the cylindrical battery cell electrically connectably available at the end of the other cell pole of the cylindrical battery cell,
wherein the connecting conductors are situated only on the connecting side,
wherein the connecting conductors are formed from ends of the at least one integrated cell connector, which ends contact one of the cell poles,
wherein the at least one integrated cell connector of a respective cylindrical battery cell encloses the respective cylindrical battery cell around its entire longitudinal axis by at least 180°.

10. A handheld power tool battery pack, comprising:
cylindrical battery cells, each of the cylindrical battery cells having a positive cell pole at one end and a negative cell pole at an opposite end,
connecting conductors provided for electrically connecting at least two of the cylindrical battery cells,
a connecting side, and
a side opposite the connecting side;
a cell holder having recesses in each of which at least one cylindrical battery cell is situated,
wherein each of the cylindrical battery cells has at least one integrated cell connector for making one of the cell poles of the cylindrical battery cell electrically connectably available at the end of the other cell pole of the cylindrical battery cell,
wherein the connecting conductors are situated only on the connecting side,
wherein the connecting conductors are formed from ends of the at least one integrated cell connector, which ends contact one of the cell poles,
wherein position holders are situated at the cylindrical battery cells, the position holders are separate from the cell holder and configured to position the cylindrical battery cells in a central position with respect to a circumference of the cell holder in the cell holder and to electrically insulate the cylindrical battery cells against the cell holder,
wherein the at least one integrated cell connector of a respective cylindrical battery cell encloses the respective cylindrical battery cell around its entire longitudinal axis by at least 180°.

* * * * *